United States Patent [19]

Nishikawa et al.

[11] 4,223,388
[45] Sep. 16, 1980

[54] SCINTILLATION CAMERA

[75] Inventors: Mineki Nishikawa, Nakamachi; Makoto Kakegawa, Kawasaki; Masayuki Iwanaga; Koujirou Shouta, both of Yokohama, all of Japan

[73] Assignee: Tokyo Shibaura Electric Co., Ltd., Japan

[21] Appl. No.: 893,516

[22] Filed: Apr. 4, 1978

[30] Foreign Application Priority Data

Apr. 4, 1977 [JP] Japan .................................. 52-38214

[51] Int. Cl.² ............................................... G01T 1/20
[52] U.S. Cl. ................................ 364/521; 250/363 S; 250/369; 364/571
[58] Field of Search ........................ 364/521, 414, 571; 250/363 S, 369, 363 R

[56] References Cited

U.S. PATENT DOCUMENTS

| 3,732,419 | 5/1973 | Kulberg et al. | 250/369 |
| 3,745,345 | 7/1973 | Muehllehner | 250/363 R |
| 3,851,177 | 11/1974 | Van Dijk et al. | 250/369 |
| 3,878,373 | 4/1975 | Blum | 364/414 |
| 3,984,689 | 10/1976 | Arseneau | 250/363 S |
| 4,060,730 | 11/1977 | Zioni et al. | 250/363 S |

Primary Examiner—Errol A. Krass
Attorney, Agent, or Firm—Finnegan, Henderson, Farabow, Garrett & Dunner

[57] ABSTRACT

A scintillation camera which detects the radiation position of radiation and visualizes the corresponding position by an oscilloscope, comprises: a reference radiation source including a radiation source and a radiation shielding member having a plurality of through-holes arranged in a matrix; a first memory for storing a picture of a reference radiation source during a calibrating mode in dependence on position signals of radiation radiated from the reference radiation source; an arithmetic unit for computing the correcting amount at each cross point in a given matrix in dependence on a departure of the position of each hole of the radiation shielding member in the picture stored in the first memory from the correct position of the corresponding hole of the actual radiation shielding member; a second memory for storing the correcting amounts at the respective cross points of the given matrix from the arithmetic unit; a correction amount calculation circuit which reads out the correcting amounts at cross points of the given matrix which are stored in the second memory and close to the position signal of a radiation to be actually measured during a measuring mode to calculate the correcting amount of the position of the radiation to be actually measured; and adding circuit for adding the correcting amounts of the position signal of the radiation to be actually measured from the correcting amount calculation circuit to the position signal from a position calculation circuit.

8 Claims, 7 Drawing Figures

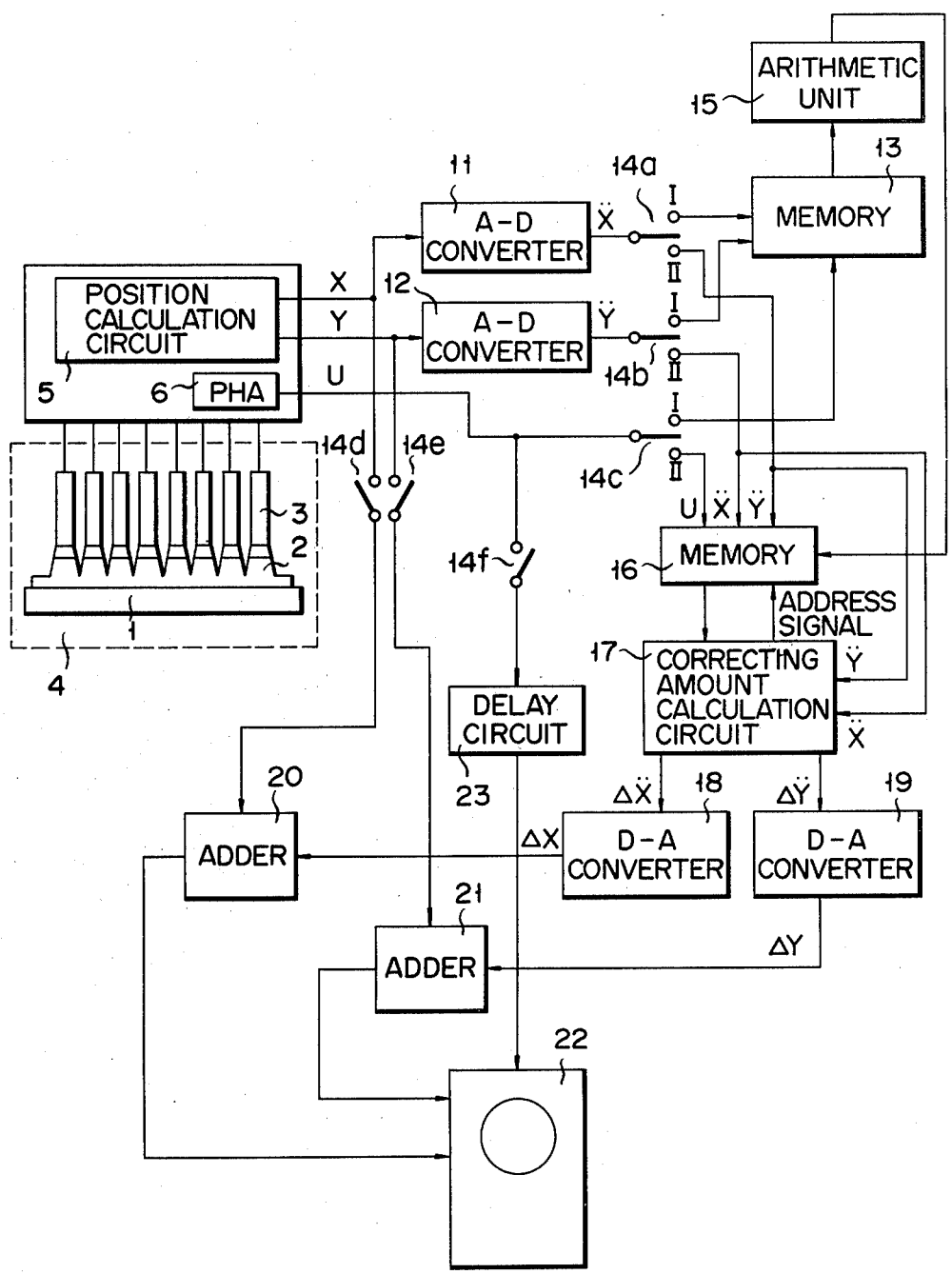

SCINTILLATION CAMERA

BACKGROUND OF THE INVENTION

The invention relates to a scintillation camera which calibrates the effect of non-linearity inherent to a radiation detecting device thereof to obtain a correct measurement of a radiation position.

As is well known, radiation such as gamma rays is generally measured by using a scintillation camera. In usual gamma rays detection, the gamma rays radiated from a radiation source, for example, the radioisotope injected into a human body or the like are detected by a scintillator such as NaI(T1). The gamma rays detected are converted into a plurality of light quanta to a measurable extent. The light quanta is guided onto photomultiplier tubes (PMT) on a plane. The outputs of the photo-multiplier tubes are applied to a position calculation circuit where the position of the gamma rays source is calculated. Additionally, the outputs are applied to a pulse height analyzer (PHA) where it is checked to see whether the energy of the outputs is within a given range or not. If the energy falls within the range, the oscilloscope displays its position as a glint spot. Generally, a radiation detecting device including the scintillator, the position calculating circuit and PHA suffers from non-linearity in its characteristic. For this, a preamplifier having the non-linearity so as to compensate for the above-mentioned non-linearity is used in an Anger type scintillation camera having a resistor matrix. However, the causes of the non-linearity are uneven characteristics of the PMT's and aging of the circuit components in addition to the non-linearity inherently produced in manufacturing. The non-linearity due to such causes brings about errors of the measuring data, resulting possibly in erroneous diagnosis.

Another conventional method corrects the non-linear effects for each unit area. However, in this method, there occurs superposition or separation of unit areas so that it is difficult to obtain a stable and correct correction.

SUMMARY OF THE INVENTION

Accordingly, an object of the invention is to provide a scintillation camera in which the effects of the non-linearity of the radiation detecting device thereof is corrected without any deterioration of the resolution and quality of a picture.

In the invention, during a calibrating mode, a reference radiation source including a radiation source and a radiation shielding member having a plurality of through-holes arranged in a matrix is used and the correcting amount at each cross point in a given matrix imaginatively depicted on the surface of a camera is computed in dependence on a departure of the electrically detected position of each hole of the radiation shielding member from the correct position of the corresponding hole of the actual radiation shielding member. The correcting amount of a radiation position signal of radiation to be actually measured is calculated depending on the correcting amounts at the cross points of the given matrix which are calculated in the calibrating mode and close to the radiation position signal, during a measuring mode. Finally, the radiation position signal is added to the correcting amount. The added signal is applied as a corrected radiation position signal to an oscilloscope, for example, for visualizing it.

According to the invention, there is provided a scintillation camera having a radiation detecting means for detecting radiation from a radiation source, a radiation position calculation circuit for calculating the radiation position of the radiation source from the output signal of the radiation detecting means and a display means for displaying the radiation position of the radiation source in response to the output signal from the radiation position calculation circuit. The scintillation camera characteristically comprises: a first memory for storing a picture of a reference radiation source including a radiation source and a radiation shielding member having a plurality of through-holes arranged in a matrix during a calibrating mode in dependence on position signals of radiation radiated from the reference radiation source; an arithmetic unit for computing the correcting amount at each cross point in a given matrix imaginatively depicted on the surface of a camera in dependence on a departure of the position of each hole of the radiation shielding member in the picture stored in the first memory from the correct position of the corresponding hole of the actual radiation shielding member; a second memory for storing the correcting amounts at the respective cross points of the given matrix from the arithmetic unit; a correcting amount calculation circuit which reads out the correcting amounts at cross points of the given matrix which are stored in the second memory and close to the position signal of a radiation to be actually measured during a measuring mode to calculate the correcting amount of the position of the radiation to be actually measured; and an adding circuit for adding the correcting amounts of the position signal of the radiation to be actually measured from the correcting amount calculation circuit to the position signal from a position calculation circuit.

Other objects and advantages of the invention will be apparent from the following description in connection with the accompanying drawings, in which:

BRIEF DESCRIPTION OF THE DRAWINGS

FIG. 1 shows a block diagram of an embodiment of a scintillation camera according to the invention;

DETAILED DESCRIPTION OF THE PREFERRED EMBODIMENT

Figure 2A:
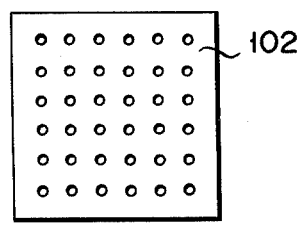
FIGS. 2A and 2B show plan and cross sectional views of a reference radiation source.

Referring now to FIG. 1, there is shown a scintillation camera according to the invention. In use, the scintillation camera is operated in calibrating mode and then in actual measuring mode. In the calibrating mode, a reference radiation source to be described in detail referring to FIGS. 2A and 2B and FIGS. 5A and 5B is used and the data relating to the reference radiation source are stored in a memory. The reference radiation source has a number of through-holes arranged in a matrix fashion, through which radiation from a radiation source passes. The data are correcting amounts of the radiations each calculated from a difference between the position of radiation at the hole in the matrix and the position of corresponding radiation detected.

Further, the data are used to compute the correcting amounts at the cross points of a given matrix imaginatively depicted on the surface of a camera. The computed correcting amounts are stored in a memory. In the measuring mode, a radiation position of radioisotope injected into a human body, for example, is measured. The correcting amount of the radiation position is calculated depending on the data stored in the memory.

In the figure, reference numeral 1 is a scintillator for converting gamma rays irradiated from a radiation source into a plurality of light quanta. Usually, NaI(T1), CSI, ZnS or the like is used for the scintillator. Reference numeral 2 is a light guide for guiding the light quanta into a photo-multiplier tube (PMT) 3. The scintillator 1, the light guide 2 and the PMT 3 cooperate to form a radiation detector 4. A position calculation circuit 5 coupled with the radiation detector 4 calculates the position of the radiation source by using the output signals from radiation detector 4 and produces signals representing the position of the radiation source in terms of X and Y analogue position signals X and Y. The output signals of the position calculation circuit 5 have been non-linearly distorted. A pulse height analyzer (PHA) 6 detects the magnitude of the gamma rays irradiated by using the output signals from the PMT 3 and produces an UNBLANK signal U when the magnitude of the radiation energy falls within a predetermined range. Analogue to digital converters 11 and 12 are coupled at the inputs to the outputs X and Y of position calculation circuit 5, respectively. These converters 11 and 12 convert the analogue position signals X and Y into digital signals $\ddot{X}$ and $\ddot{Y}$, respectively. In the specification, a digital signal will be expressed by placing dots ¨ above the symbol attached thereto such as $\ddot{Y}$ and $\ddot{X}$. A first memory 13 receives the digital signals $\ddot{X}$ and $\ddot{Y}$ of the A/D converters 11 and 12 through switches 14a and 14b, during a calibrating mode. In other words, the memory 13 receives the position signals obtained through the radiation from the reference radiation source to store the picture of the reference radiation source. As briefly mentioned, the reference radiation source is used in the calibrating mode, disposing in front of the scintillator 1. This construction and function will be discussed referring to FIGS. 2A and 2B and FIGS. 5A and 5B. The memory 13 further receives the output signal from the PHA 6 through a switch 14c during the calibrating mode. A "1" is added to the contents in the address specified by the digital position signals $\ddot{X}$ and $\ddot{Y}$ having been received by the memory 13 when it receives the output signal from the PHA 6. As a result, the image of respective holes arranged in the matrix of the reference radiation source is stored in the memory 13. An arithmetic unit 15 reads out the image of the respective holes stored in the memory 13, calculates the correcting amounts at cross points of the given matrix imaginatively depicted on the surface of a camera depending on a departure of the position of each hole of the matrix-arranged holes of the reference radiation source from the correct position of each hole of the source. This will be described later in detail. The arithmetic unit 15 may be constructed by a microcomputer. A second memory 16 receives the UNBLANK signal U from the PHA 6, and the digital position signals $\ddot{X}$ and $\ddot{Y}$ from the A/D converters 11 and 12, through the switches 14a, 14b and 14c, and also the result of the calculation in the arithmetic unit 15. A correcting amount calculation circuit 17 receives the $\ddot{X}$ and $\ddot{Y}$ signals and reads out the contents of the memory 16.

The circuit 17 calculates the correction amounts $\Delta\ddot{X}$ and $\Delta\ddot{Y}$ of the position signals $\ddot{X}$ and $\ddot{Y}$. Digital to analogue converters 18 and 19 convert the correcting amounts $\Delta\ddot{X}$ and $\Delta\ddot{Y}$ from the circuit 17 into analogue signals $\Delta X$ and $\Delta Y$. An adder 20 adds the X signal from the position detection circuit 5 to the output signal $\Delta X$ from the D/A converter 18. Another adder 21 adds the signal Y from the circuit 5 to the signal $\Delta Y$ from the D/A converter 19. A switch 14d intervenes between the X output of the position calculation circuit 5 and the adder 20 and another switch 14e, between the Y output of the circuit 5 and the adder 21. An oscilloscope 22 receives the outputs of the adders 20 and 21 and the output of a delay circuit 23 connected to the output of the PHA 6 via a switch 14f. The delay circuit 23 delays the UNBLANK signal till the correcting operation in the delay circuit 23 is completed. Incidentally, in the block diagram shown in FIG. 1, control circuits for accessing the first and second memories 13 and 16 and a timing control circuit for the position signals X and Y from the position calculation circuit 5 and the UNBLANK signal U from the PHA 6 are omitted, for ease of explanation.

An explanation will be given about a calibrating mode of the non-linearity of the radiation detector 4 in the scintillation camera thus constructed. In the calibrating mode, the correcting amounts at the cross points are calculated for each cross point and the calculated correcting amounts are loaded into the second memory 16. The correcting amounts at the respective cross points of the matrix holes of the reference radiation source are calculated for each cross point in the arithmetic unit 15. The calculated correcting amounts are used to compute the correcting amounts at the cross points of the given matrix imaginatively depicted on the surface of a camera, in the arithmetic unit 15. Then, the computed correcting amounts at the cross points of the given matrix is loaded into the second memory 16. In the measuring mode, the contents of the memory 16 is read out and used to calculate the correcting amount of the position of a radiation to be actually measured. The calculated correcting amount of the position of the actual radiation is then added to the position signal from the position calculation circuit 5 so that the radiation position is corrected. Thus, a corrected position signal is applied to the oscilloscope where it is displayed as a glint point on the cathode ray tube (CRT) of the oscilloscope 22. This operation will be detailed later.

Figure 2B:
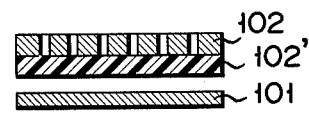

As briefly described above, the reference radiation source is disposed in front of the scintillator 1. The structure of one form of the reference radiation source is shown in FIGS. 2A and 2B. As shown, the reference radiation source is comprised of a radiation source 101 with a plate shape and a lead plate 102 spaced from the radiation source plate 101. A plate 102' layered on the underside of the lead plate 102 is used for preventing the lead plate 102 from bending and is made of material permitting radiation to pass therethrough such as acrylic acid resin. The lead plate 102 has a number of holes (6×6=36 holes in this example) arranged in a matrix fashion. The number of the holes is not limited to 6×6=36 and any suitable number of the holes, for example, 32×32=1,024 is usable if necessary, as will subsequently be described. The gamma rays irradiated from radiation source 101 pass through those holes of the lead plate 102 to irradiate the scintillator 1. The positions of the gamma rays from the respective holes are calculated by the position calculation circuit 5. The output signals X and Y from the circuit 5 are applied to the A/D converters 11 and 12 where those are converted into digital signals $\ddot{X}$ and $\ddot{Y}$. As known, the A/D converter produces digital signal corresponding to the levels of the analogue signal. The accuracy of the A/D conversion of the output digital signal from the A/D converter depends on the performance of the A/D converter itself. In this example, the respective A/D converters produce 10 bits outputs, respectively. The PHA judges as to whether the magnitude of the gamma rays is within a predetermined range. Under this condition, the switches 14a to 14c are turned to contacts I, while the switches 14d to 14f are left open. Accordingly, the digital position signals $\ddot{X}$ and $\ddot{Y}$ are applied to the memory 13 to specify the corresponding address in the memory 13. At this time, if the UNBLANK signal is applied from the PHA 6 to the memory 13, "1" is added to the contents in the address specified by the signals $\ddot{X}$ and $\ddot{Y}$. In this manner, the picture of the reference radiation source is stored in the memory 13 through the position signals originating from the reference radiation source. The reproducibility of the picture stored in the memory 13 depends on the accuracy of the A/D converters 11 and 12 and the memory capacity of the memory 13. In this example, the memory capacity of the memory 13 is 128×128. The picture information stored in the memory 13 is read out by the arithmetic unit 15 such as a microcomputer. The arithmetic unit 15 has the correct positions of the matrix-arranged holes of the lead plate 102. Reading out the image of the position signals from the first memory 13, the arithmetic unit 15 computes the correcting amounts at the cross points of the given matrix imaginatively depicted on the surface of a camera. The computation of the correcting amounts is performed by using a departure of the position of each hole of the matrix-arranged holes of the lead plate 102 of the reference radiation source from that of each hole of the image stored in the first memory 13. The correcting amounts computed at the respective cross points of the given matrix are then loaded into the second memory 16.

The image information stored in the memory 13 is sufficient to reproduce an image of the gamma rays passed through the matrix-arranged holes of the lead plate 102 from the radiation source 101, although they are influenced by the non-linearity of the circuit system. That is, an image of the matrix-arranged 32 holes which is partially distorted is stored in the memory 13. The arithmetic unit 15 computes the correcting amounts at the respective cross points of the given matrix on the camera surface by using such image information from the memory 13.

It is found how much and in what direction the positions of the 6×6 hole images depart from the actual hole positions. Accordingly, the correct amounts of the respective holes are first calculated by the microcomputer 15. Then, the correcting amounts of the cross points of the given matrix are calculated in dependence on the correcting amounts of the images of the holes of the lead plate 102. These correcting amounts are stored in the second memory 16.

In this example, the number of the holes of the lead plate 102 is 6×6 and the same as that of the cross points of the given matrix on the actual camera surface. However, the number of these is not limited to this. Any suitable number of them, for example, 32×32 is permitted if necessary. The number of the cross points of the given matrix is determined depending on the memory capacity of the second memory. In this manner, the calibration operation is performed against the non-linearity particularity of the radiation detector 4.

Figure 3:
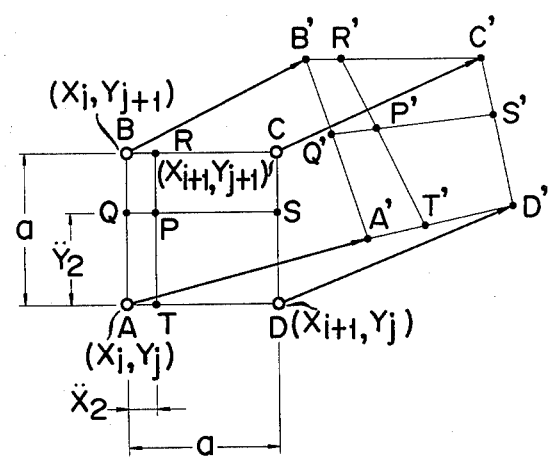
FIG. 3 is a diagram for illustrating the correcting operation of a radiation point of a radiation to be actually measured in the scintillation camera.

The explanation to be given is an actual radiation measurement to measure gamma rays radiated from radioisotope injected into a human body, for example. Firstly, the scintillator 1 is placed on the portion of the human body to be measured and then the switches 14a to 14c are turned to contacts II while the switches 14d to 14f are closed. Accordingly, the digital position signals $\ddot{X}$ and $\ddot{Y}$ from the A/D converters 11 and 12 are inputted to the second memory 16, and to the correcting amount calculation circuit 17. The analogue position signals from the position detection circuit 5 are applied to the adders 20 and 21, respectively. In actual measurement, the position of the radiation to be measured is calculated by using the correcting amounts at some given cross points of the given matrix and in accordance with a given calculating method. The given matrix is imaginatively depicted on the camera surface as mentioned above. The radiation to be measured is observed through the camera and thus the position of the radiation is disposed on the same given matrix. In preparation for this calculation in this measuring mode, the correcting amounts at the cross points of the given matrix are computed on the matrix-arranged hole data of the reference radiation source and stored in the second memory 16, in the calibrating mode. This will be detailed referring to FIGS. 3 and 4. In FIG. 3, a point P corresponds to the position of the radiation to be measured. Points A, B, C and D correspond to the given cross points of the given matrix.

Reference is made to FIG. 3. Assume now that the digital signals $\ddot{X}$ and $\ddot{Y}$ specify the point P in FIG. 3. The point P resides in an area enclosed by four cross points A ($X_i$; $Y_i$), B ($X_i$; $Y_{j+1}$), C ($X_{i+1}$; $Y_{i+1}$) and D ($X_{i+1}$; $Y_i$) of the given matrix which are stored in the second memory 16 and disposed close to the point A. In this case, the correcting amount calculation circuit 17 reads out the correcting amounts ($\Delta X_{i,j}$; $\Delta Y_{i,j}$), ($\Delta X_{i,j+1}$; $\Delta Y_{i,j+1}$), ($\Delta X_{i+1,j+1}$; $\Delta Y_{i+1,j+1}$), ($\Delta X_{i+1,j}$; $\Delta Y_{i+1,j}$) at the respective points A, B, C and D, from the memory 16. Here, ($\Delta X_{i,j}$; $\Delta Y_{i,j}$), for example, indicates that the X component of a correcting vector is $\Delta X_{i,j}$ and the Y component is $\Delta Y_{i,j}$. These four points A to D are corrected to be points A' to D', respectively. The respective points of intersections of the perpendiculars from the point P to sides AB, BC, CD and DA are represented by Q, R, S and T, respectively. The following relations hold.

BQ:QA=B'Q':Q'A'

BR:RC=B'R':R'C'

CS:SD=C'S':S'D'

DT:TA=D'T':T'A' where Q', R', S' and T' points of intersections of the perpendiculars from the point P' to sides A'B', B'C', C'D' and D'A'. From the above relations, the four points Q', R', S' and T' are obtained. Therefore, the point P' of intersection of a line R'T' with a line Q'S' may be obtained. For ease of explanation to be given later, AT (=BR) is expressed by $\ddot{X}_2$ and AQ (=DS) by $\ddot{Y}_2$. A vector PṖ represents a correcting vector with respect to the position signals $\ddot{X}$ and $\ddot{Y}$ of the point P. The X component, $\Delta\ddot{X}$, of the correcting vector is applied to the D/A converter 18 while the Y component, $\Delta\ddot{Y}$ of the same to the D/A converter 19. Upon receipt of these components, the converter 18 produces an analogue signal $\Delta X$ which in turn is applied to the adder 20, and the converter 29 produces an analogue signal $\Delta Y$ which is then applied to the adder 21. In the adder 20, the analogue signal X from the position calculation circuits 5 is added to the analogue signal $\Delta X$ from the converter 18. The adder 20 adds the analogue signal Y to the analogue signal $\Delta Y$. Receiving the outputs of the addresses 20 and 21 and the UNBLANK signal from the PHA 6 via the delay circuit 23, the oscilloscope 22 visualizes the position of the gamma radiation determined by the corrected position signals on the CRT. In this manner, a correct position of the gamma rays is displayed on the oscilloscope with correction of the position departure due to the non-linearity of the radiation detector.

An explanation will be given about the second memory 16 below. The second memory 16 is a matrix memory with 32 row lines and 32 column lines in which memory cells are disposed at the cross points of the row and column lines. The memory cells of $32 \times 32$ store the correcting amounts at the respective cross points calculated by the arithmetic unit 15 during the calibrating operation. In this example, the matrix $32 \times 32$ is used for the given matrix as mentioned above. The address, i.e. the cross point, of the second memory 16 is addressed by a 10 bits address signal including the lower part digits of 5 bits counted from the MSB (most significant bit) of the $\ddot{X}$ signal (i.e. the row selecting signal) and the lower part digits of 5 bits counted from the MSB of the $\ddot{Y}$ signal. As recalled, the $\ddot{X}$ and $\ddot{Y}$ signals are each comprised of 10 bits. In the thus constructed memory 16, an address, for example, (Xm, Yn) designates (m+32n) of the address. The reason for this is that binary 10000 corresponds to 32 of decimal number. When each memory cell is constructed by 12 bits, the upper part digits of 6 bits are used for storing the correcting vector $\Delta Y_{i,j}$ and the lower part digits of 6 bits store the correcting vector $\Delta X_{i,j}$. In this way, if the memory capacity of the second memory is properly set up, the number of the row and column lines of the matrix may be correspondingly changed. That is, the size of the given matrix may be properly selected with relation to the memory capacity of the second memory.

Figure 4:
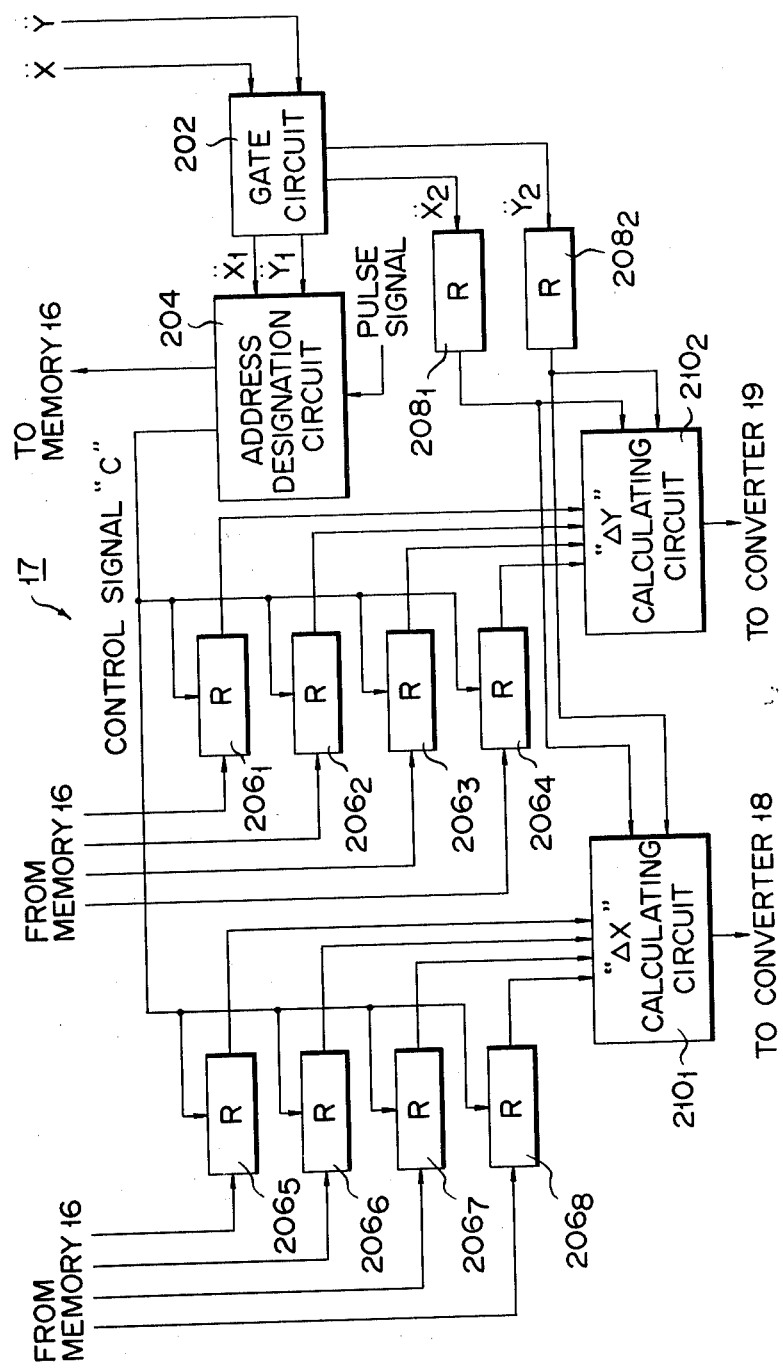
FIG. 4 shows a block diagram of a correcting amount calculation circuit used in the FIG. 1 circuit.

The description to follow is the construction of the correcting amount calculation circuit 17 and the calculating operation of the correcting amounts. Referring now to FIG. 4, a gate circuit 202 of the correcting amount calculation circuit 17 receives the digital position signals $\ddot{X}$ and $\ddot{Y}$ each having 10 bits. In the gate circuit 202, these signals $\ddot{X}$ and $\ddot{Y}$ are divided into two: one is a signal $\ddot{X}_1$ and $\ddot{Y}_1$ for specifying the point A $(X_i, Y_i)$ and the other signal $\ddot{X}_2$ and $\ddot{Y}_2$ for specifying the point P. The signals $\ddot{X}_1$ and $\ddot{Y}_1$ are comprised of 5 bits counted from the MSB's of the signals $\ddot{X}$ and $\ddot{Y}$. The signals $\ddot{X}_2$ and $\ddot{Y}_2$ are comprised of the remaining 5 bits of the same signals. An address designating circuit 204 receives the signal $\ddot{X}_1$ and $\ddot{Y}_1$ from the gate circuit 202. The circuit 204 provides to the second memory 16 an address signal of which the upper part includes 5 bits of the signal $\ddot{Y}_1$ and the lower part includes 5 bits of the signal $\ddot{X}_1$. The circuit 204 also provides to the memory 16 another address signal for specifying the point D which is formed by adding "1" to the 10 bits address. An address signal outputted from the circuit 204 to the memory 16 is used to specify the point C and is formed by adding 32 of decimal number to the point D specifying address. An additional address from the circuit 204 to the second memory 16 specifies the point C formed by subtracting 1 from the point D specifying address signal. The address designating circuit 204 further produces a control signal C to a plurality of registers to be described which receive the correcting amounts of the close four cross points from the second memory 16. Registers $206_1$ to $206_8$ store the correcting amounts at the points A to D read out of the memory 16 under control of the control signal C of the address designating circuit 204. The registers $206_1$ and $206_5$ store the correcting amounts $\Delta Y_{i,j}$ and $\Delta X_{i,j}$ at the point A; the registers $206_2$ and $206_6$ the correcting amounts $\Delta Y_{i+1,j}$ and $\Delta X_{i+1,j}$ at the point D; the registers $206_3$ and $206_7$ the correcting amounts $\Delta Y_{i+1,j+1}$ and $\Delta X_{i+1,j+1}$ at the point C; the registers $206_4$ and $206_8$ $\Delta Y_{i,j+1}$ and $\Delta X_{i,j+1}$ at the point B. A register $208_1$ stores the position signal $\ddot{X}_2$ for indicating the position P from the point A. A register $208_2$ stores the position signal $\ddot{Y}_2$ for indicating the position P from the point A. A $\Delta Y$ calculating circuit $210_2$ calculates the correcting amount $\Delta Y$ for the point P in the Y direction in dependence on the outputs from the register $208_1$ and the registers $206_1$ to $206_4$. A $\Delta X$ calculating circuit $210_1$ stores the correcting amount $\Delta X$ for the point P in the X direction in dependence on the outputs from the register $208_2$ and the registers $206_5$ to $206_8$.

In operation, gamma rays from a human body, for example, are irradiated onto the scintillator 1. The irradiation position of the gamma rays is calculated by the position calculation circuit 5. The position signals from the circuit 5 are applied to the A/D converters 11 and 12 where they are converted into 10 bits digital signals, i.e. $\ddot{X}$ and $\ddot{Y}$ digital signals. The position signals $\ddot{X}$ and $\ddot{Y}$ go via switches 14a and 14b to the gate circuit 202 of the correcting amount calculation circuit 17. The gate circuit 202 makes from these position signals $\ddot{X}$ and $\ddot{Y}$ an address signal $\ddot{X}_1$ and $\ddot{Y}_1$ for specifying the point A $(X_i, Y_i)$ and another address signal $\ddot{X}_2$ and $\ddot{Y}_2$ for specifying the point P. As previously stated, the address signal for specifying the point A is a 10 bits signal of which the upper part is comprised of 5 bits counted from MSB of the $\ddot{Y}$ signal and the lower part is comprised of 5 bits counted from MSB of the $\ddot{Y}$ signal. The address signal for specifying the point P is also a 10 bits signal of which the upper and lower parts are each comprised of the remaining 5 bits of the $\ddot{X}$ and $\ddot{Y}$ signals. The address designating circuit 204 makes from the point A specifying address signal $\ddot{X}_1$ and $\ddot{Y}_1$ address signals for specifying the points B to D in synchronism with a synchronizing signal from exterior. Upon receipt of the address signals $\ddot{X}_1$ and $\ddot{Y}_1$, the address designating circuit 204 outputs an address signal for specifying the address $(X_i, Y_i)$ of the second memory 16. At the same time, the address designating circuit 204 produces the control signal C to the registers $206_1$ to $206_8$. Under control of the control signal C, the registers $206_1$ and $206_5$ store the correcting amounts $(\Delta X_{i,j}, \Delta Y_{i,j})$ at the point A read out from the memory 16; the registers $206_2$ and $206_6$ the correcting amounts $(\Delta X_{i+1,j}, \Delta Y_{i+1,j})$ at the point D; the registers $206_3$ and $206_7$ the correcting amounts $(\Delta Y_{i+1,j+1}; \Delta X_{i+1,j+1})$ at the point C; the registers $206_4$ and $206_8$ the correcting amounts $(\Delta Y_{i,j+1}; \Delta X_{i,j+1})$ at the point B. The registers $208_1$ and $208_2$ store the position signals $\ddot{X}_2$ and $\ddot{Y}_2$ from the gate circuit 202. The correcting amounts $\Delta Y_{i,j}$ and $\Delta X_{i,j}$ stored in the registers $206_1$ and $206_8$ are inputted into the calculation circuits $210_1$ and $210_2$. The position signals $\ddot{X}_2$ and $\ddot{Y}_2$ from the registers $208_1$ and $208_2$ also are applied to the circuits $210_1$ and $210_2$. The calculation circuits $210_1$ and $210_2$ calculate the correcting amounts $\Delta \ddot{Y}$ and $\Delta \ddot{X}$ of the position signals $\ddot{X}$ and $\ddot{Y}$. Thus calculated correcting amounts $\Delta \ddot{X}$ and $\Delta \ddot{Y}$ are then applied to the D/A converters 19 and 18 where the signals are converted from digital to analogue form. The succeeding operation is as mentioned previously so that it will be omitted here.

The correcting amounts $\Delta \ddot{X}$ and $\Delta \ddot{Y}$ are given by equations (1) and (2):

$$\Delta \ddot{X} = 1/a^2 \{ \Delta X_{i,j} \cdot (a - \ddot{X}_2) \cdot (a - \ddot{Y}_2) + \Delta X_{i+1,j} \cdot \ddot{X}_2 \cdot (a - \ddot{Y}_2) + \Delta X_{i,j+1} \cdot (a - \ddot{X}_2) \cdot \ddot{Y}_2 + \Delta X_{i+1,j+1} \cdot \ddot{X}_2 \cdot \ddot{Y}_2 \} \quad (1)$$

$$\Delta \ddot{Y} = 1/a^2 \{ \Delta Y_{i,j} \cdot (a - \ddot{X}_2) \cdot (a - \ddot{Y}_2) + \Delta Y_{i+1,j} \cdot \ddot{X}_2 \cdot (a - \ddot{Y}_2) + \Delta Y_{i,j+1} \cdot (a - \ddot{X}_2) \cdot \ddot{Y}_2 + \Delta Y_{i+1,j+1} \cdot \ddot{X}_2 \cdot \ddot{Y}_2 \} \quad (2)$$

The correcting amounts $\Delta \ddot{X}$ and $\Delta \ddot{Y}$ may readily be obtained by constructing the circuits $210_1$ and $210_2$ so as to solve the equations (1) and (2). Such construction is possible by the well known technology in this field. In binary calculation, $(a - \ddot{X}_2)$ and $(a - \ddot{Y}_2)$ in the equations (1) and (2) may easily be obtained as complements of 32 of $\ddot{X}_2$ and $\ddot{Y}_2$. The logical calculation of $1/a^2 = 1/1,024$ ($a = 32$, using as a unit the least significant bit LSB in the A/D conversion) may be attained by shifting by 10 bits the result of the calculation of { } in the equations. In fact, however, the D/A conversion following this is necessary only for the upper part bits except the 10 bits counted from the LSB. Therefore, it is unnecessary to perform division which is most troublesome in logical calculation. As seen from the equations (1) and (2), if the $\Delta Y_{i,j} \dots$ in the equation (2) is replaced by the $\Delta X_{i,j} \dots$ in the equation (1), the equation (2) is equivalent to the equation (1). Accordingly, the same type of calculation circuit may be employed. The circuit in FIG. 4 employs eight registers $206_1$ to $206_8$ for storing the correcting amounts. As seen from the equations (1) and (2), however, if given calculations (calculations of the corresponding terms in the equations) are performed every time the correcting amounts $\Delta X_{i,j}$ and $\Delta Y_{i,j}$ at one point are applied, and the results of the calculations are successively applied to zero-cleared registers or accumulators, only two registers are necessary. This leads to cost reduction of the device.

The circuit shown in FIG. 4 is preferable for the correcting amount calculation circuit 17, in order to gain high performance of the counting ratio in the scintillation camera. However, it is principally possible to use an arithmetic unit of a microcomputer and the like, such as the microcomputer 15. Further, the calculations of the equations (1) and (2) may be processed by the analogue technology in a manner that the correcting amounts $\Delta X_{i,j}$ and $\Delta Y_{i,j}$ at the respective points are A/D converted and the signals $\ddot{X}_2$ and $\ddot{Y}_2$ are D/A converted or that the analogue position signals X and Y from the position calculation circuit 5 are A/D converted, the A/D converted one is then D/A converted, and the D/A converted one of which the remainder is removed is applied to an analogue operational amplifier.

Figure 5A:
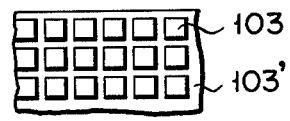
FIGS. 5A and 5B show plan and cross sectional views of another type of the reference radiation source.
Figure 5B:
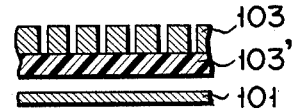

In place of the lead plate 102 as shown in FIG. 2A, a lead plate 103 as shown in FIGS. 5A and 5B may be used in which continuous elongated holes are formed along the row and column lines. In this case, the correcting amounts at the cross points where the row and column lines intersect and these at the sides connecting the cross points are calculated at the calibrating mode. In the measuring mode, the correcting amounts of the position signals are calculated by using such correcting amounts at the cross points and the sides. This method further improves the non-linear correction in question. Numeral 103' in FIG. 5B corresponds to the plate 101' in FIG. 2B.

As described above, the correcting amounts of the radiation position are calculated at each cross point by using the reference radiation source, and the correcting amount of the radiation signal is calculated by using cross points near it. Therefore, the invention completely eliminates poor picture quality due to superposition or separation of unit area which is adherent to the conventional scintillation camera.

Additionally, in such a conventional camera, the unit area is further subdivided in order to improve the unevenness of the unit areas. In this case, a large memory capacity is necessary. On the other hand, in the invention, the memory capacity may be small because the correction is made at each cross point.

What we claim is:

1. A scintillation camera having a radiation detecting means for detecting radiation, a radiation position calculation means for calculating the radiation position from the output signal of the radiation detecting means and a display means for displaying the radiation position in response to the output position signal from the radiation position calculation means, comprising: reference radiation means including a radiation shielding member having a plurality of through-holes; a first memory for storing a picture of said reference radiation means during a calibrating mode in dependence on said position signal of said radiation position calculation means when detecting radiation radiated from said reference radiation means; an arithmetic unit for computing a reference correcting amount at each cross point in a given matrix in dependence on a departure of the position of each hole of said radiation shielding member in said picture stored in said first memory from the actual position of the corresponding hole of said radiation shielding member; a second memory for storing said reference correcting amounts; a correcting amount calculation circuit which, during a measuring mode of the position of a radiation to be measured and in response to said position signal from said radiation position calculation means, reads from said second memory selective reference correcting amounts and utilizes said selective reference correcting amounts to calculate a correcting amount for the position of said radiation to be measured; and an adding circuit for adding said correcting amount to said position signal from said radiation position calculation means when detecting said radiation to be measured.

2. A scintillation camera according to claim 1, in which said correcting amount calculation circuit calculates said correcting amount for the position of said radiation to be measured based on the reference correcting amount stored in said second memory which corresponds to the cross point of said given matrix which is closest to the position indicated by said position signal.

3. A scintillation camera according to claim 1, in which said correcting amount calculation circuit calculates said correcting amount for the position of said radiation to be measured based on the reference correcting amounts stored in said second memory which correspond to the four cross points of said given matrix which enclose the position indicated by said position signal.

4. A scintillation camera according to claim 3, in which the size of said matrix is determined by the memory capacity of said second memory.

5. A scintillation camera according to claim 3, in which said second memory is a part of said first memory.

6. A scintillation camera according to claim 3, including means for representing said position signal in digital form and in which said correcting amount calculation circuit comprises: a gate circuit for dividing said position signal for the radiation to be measured into a first signal including a desired number of digits counted from the most significant digit of said position signal and a second signal including the rest of the digits of said position signal; and address designating circuit for reading from said second memory the reference correcting amount corresponding to each cross point of said given matrix in response to the first of said divided signals; registers for storing said reference correcting amounts; and a calculating circuit for calculating said correcting amount for said position signal based on said reference correcting amounts stored in said registers and said second signal.

7. A scintillation camera according to claim 1, in which said radiation shielding member of the reference radiation means has a plurality of elongated through-holes arranged in a matrix fashion.

8. A scintillation camera according to claim 1, in which said radiation shielding member of the reference radiation means has a plurality of holes disposed at cross points of a matrix.

* * * * *